United States Patent
Aakolk et al.

(10) Patent No.: US 8,074,228 B2
(45) Date of Patent: *Dec. 6, 2011

(54) SYSTEMS AND METHODS FOR PROVIDING MOCKUP BUSINESS OBJECTS

(75) Inventors: Michael Aakolk, Wiesloch (DE); Frank Brunswig, Heidelberg (DE); Wolfgang Koch, Octingon (DE); Abhay A. Tiple, Sandhausen (DE)

(73) Assignee: SAP AG, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/950,740

(22) Filed: Nov. 19, 2010

(65) Prior Publication Data

US 2011/0066660 A1    Mar. 17, 2011

Related U.S. Application Data

(63) Continuation of application No. 11/311,221, filed on Dec. 20, 2005, now Pat. No. 7,865,900.

(51) Int. Cl.
*G06F 3/00* (2006.01)
*G06F 7/00* (2006.01)

(52) U.S. Cl. ........................ 719/310; 707/705
(58) Field of Classification Search .................. 719/310; 707/705
See application file for complete search history.

(56) References Cited

U.S. PATENT DOCUMENTS

| | | | |
|---|---|---|---|
| 6,516,322 B1 * | 2/2003 | Meredith ............................. | 1/1 |
| 6,658,644 B1 | 12/2003 | Bishop et al. | |
| 7,415,484 B1 | 8/2008 | Tulkoff et al. | |
| 7,526,487 B1 | 4/2009 | Bobbitt et al. | |
| 2003/0023527 A1* | 1/2003 | Wilce et al. ..................... | 705/35 |
| 2004/0230559 A1 | 11/2004 | Newman et al. | |

OTHER PUBLICATIONS

Yair Wand, Theoretical Foundations for conceptual modelling in information systems development, 1995.*
Empirical Software, The CAP framework for business process modelling, 1998.

* cited by examiner

*Primary Examiner* — Lechi Truong
(74) *Attorney, Agent, or Firm* — Mintz, Levin, Cohn, Ferris, Glovsky and Popeo, P.C.

(57) ABSTRACT

Methods and apparatus, including computer program products, are provided for a mockup business object. The mockup business object implemented within a computer framework including other business objects. In one exemplary embodiment, the method may include generating, within the computer framework, the mockup business object based on a metadata stored within the computer framework, when the mockup business object does not exist within the computer framework. The method may also include determining whether a structure of the mockup business object has changed based on the metadata, when the mockup business object does exist within the computer framework. Moreover, the method may include modifying the mockup business object based on the result of the determining step.

18 Claims, 5 Drawing Sheets

SYSTEMS AND METHODS FOR PROVIDING MOCKUP BUSINESS OBJECTS

CROSS-REFERENCE TO RELATED APPLICATION

This application is a continuation application of U.S. patent application Ser. No. 11/311,221, entitled "SYSTEMS AND METHODS FOR PROVIDING MOCKUP BUSINESS OBJECTS," and filed Dec. 20, 2005, the content of which is hereby incorporated by reference in its entirety.

FIELD OF THE INVENTION

The present invention generally relates to data processing. More particularly, the present invention relates to systems and methods for implementing mockup business objects.

BACKGROUND OF THE INVENTION

There is, and will continue to be, advances and changes in how enterprises conduct business. Whether these advances and changes occur through growing competition and globalization, mergers and acquisition, or a revamping of business models, the key for success will often depend on how quickly the enterprise's information technology (IT) organization can adapt to evolving business needs. Therefore, a major challenge to these enterprises is how they handle change.

For organizations to enable business agility, they must ensure that enterprise applications are not only high-performance business engines driving efficiencies, but also that they become flexible building blocks of future business systems. A recent promising solution has risen in the form of services. A service, such as a Web service or program, represents a self-contained, self-describing piece of application functionality that can be found and accessed by other applications. A service is self-contained because the application using the service does not have to depend on anything other than the service itself, and self-describing because all the information on how to use the service can be obtained from the service itself. The descriptions are centrally stored and accessible through standard mechanisms.

Instead of requiring programmers to establish and maintain links between applications, services are loosely coupled, making connections simpler and more flexible and allowing application architects to more easily find and understand services offered by other cooperative applications. However, the problem that exists with services is that they are often designed to expose functionality of individual applications and thus are too limited to be efficient building blocks for enterprise-wide business processes. A solution to this shortfall has been the migration to a Service Oriented Architecture (SOA). The SOA is an open architecture middleware, which builds on the benefits of services. An example of an SOA can be found in the Enterprise Service Framework (ESF), which is commercially available from SAP AG, Walldorf, Germany. The term "SOA" may also be used to refer to "distributed objects" architecture, such as CORBA (Common Object Request Broker Architecture) and DCOM (Distributed Component Object Model).

The SOA enables the abstraction of business objects (BO), modeled as services (also referred to as enterprise services), from actual applications. Aggregating services into business-level enterprise services may provide more meaningful building blocks for the task of automating enterprise-scale business scenarios. Enterprise services allow IT organizations to efficiently develop composite applications, defined as applications that compose functionality and information from existing systems to support new business processes or scenarios.

The SOA also enables the use of an enterprise services repository. The enterprise services repository stores relevant pre-existing enterprise services and makes them available to selected partners and customers. By using the enterprise services repository, these selected partners and customers can use the pre-existing enterprise services to aid in the implementation of new services and corresponding business objects. The term business object (BO) represents a physical or logical object of significance to a business, such as a purchase order. An "object" refers to a software bundle of variables (e.g., data) and related methods. For example, in object-oriented programming, an object is a concrete realization (instance) of a class that consists of data and the operations associated with that data.

When services and business objects are developed, the development of other system components are delayed until the completion of the service and the corresponding business objects. For example, a user interface that interacts with a service for providing purchase orders would be delayed until the service for providing the business objects is completed. As such, there is a need to improve development of services and business objects.

SUMMARY OF THE INVENTION

The present invention provides methods and apparatus, including computer program products, for providing mockup business objects.

In one exemplary embodiment, there is provided a method for providing a mockup business object, the mockup business object implemented within a computer framework including other business objects. The method may include generating, within the computer framework, the mockup business object based on a metadata stored within the computer framework, when the mockup business object does not exist within the computer framework. Moreover, the method may include determining whether a structure of the mockup business object has changed based on the metadata, when the mockup business object does exist within the computer framework. The method may also include modifying the mockup business object based on the result of the determining step.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, show certain aspects of the present invention and, together with the description, help explain some of the principles associated with the invention. In the drawings.

DESCRIPTION OF THE EMBODIMENTS

Reference will now be made in detail to the invention, examples of which are illustrated in the accompanying drawings. The implementations set forth in the following description do not represent all implementations consistent with the claimed invention. Instead, they are merely some examples consistent with certain aspects related to the invention. Wherever possible, the same reference numbers will be used throughout the drawings to refer to the same or like parts.

Figure 1A:
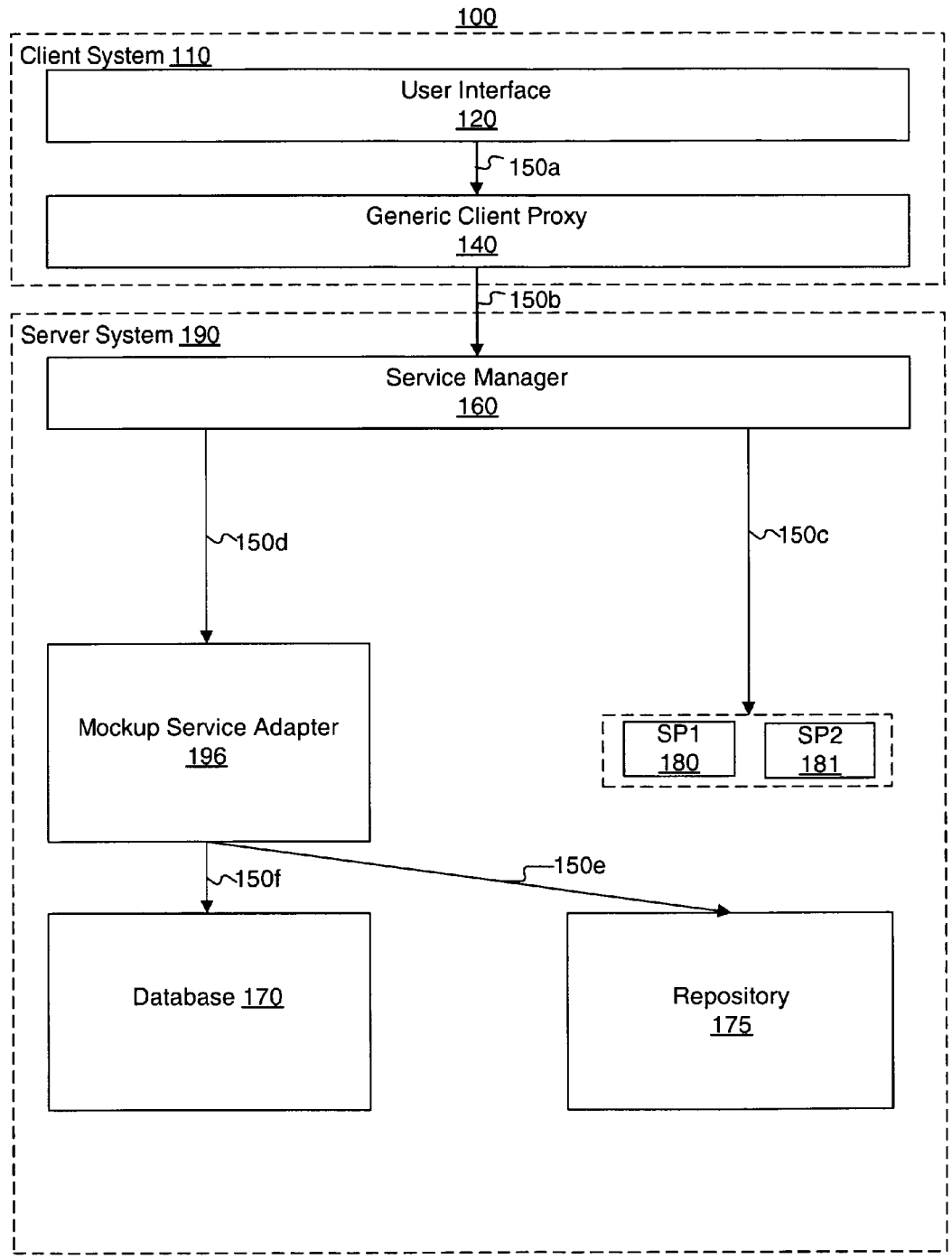
FIG. 1A illustrates a block diagram of an exemplary system environment consistent with certain aspects related to the present invention.

FIG. 1A is a block diagram of an exemplary system 100 environment that includes a client system 110 and a server system 190 for generating business objects. The business objects may serve as mockups that are stored in mockup storage for use at runtime. By providing a persistence framework for the mockup business objects, the mockup business objects can be used independently of the actual business objects, such as the business objects implemented when the development of system 100 is completed or finalized. As such, the mockup business objects that are generated allow development of components of system 100, such as the development of user interfaces, to proceed independently of, and in parallel to, the implementation of the actual business objects.

Referring to FIG. 1A, client system 110 includes a user interface (UI) 120 and a generic client proxy (GCP) 140. Client system 110 connects to server system 190 through network connection 150b. Server system 190 further includes a service manager (SM) 160, a repository 175, a mockup service adapter 196, a database 170, and service providers 180-181. System 100 may be implemented as part of an enterprise services framework (ESF). An enterprise services framework is a type of computer framework, such as a client-server architectural framework, that includes one or more services. The services are accessible to other parts of the ESF, such as client systems and their corresponding users, through a communication mechanism such as the Internet or an intranet. The ESF may be constructed using tools provided by SAP Netweaver™ (commercially available from SAP AG, Walldorf, Germany). Although FIG. 1A shows a single client system 110 and a single server system 190, a plurality of client systems and server systems may be used. Moreover, the components depicted in FIG. 1A may be distributed among multiple locations. Although FIG. 1A is described with respect to a client-server architecture and an ESF, system 100 can also use any other architecture or framework.

Client system 110 may include one or more processors, such as computers, to interface with server system 190. User interface 120 may provide an interface to allow a user to interact with other applications, such as service providers 180-181 and their corresponding business objects. User interface 120 may include a browser to provide content from service providers 180-182. In some implementations, SAP Web Dynpro (commercially available from SAP AG, Walldorf, Germany) is used as a model-based development environment for generating user interface 120, although other development environments can also be used. User interface 120 may call the API of generic client proxy 140 through network connection 150a to, for example, interact with one of the service providers 180-181.

Generic client proxy 140 may have an API implemented at client 110 that is accessible to user interface 120. When instantiated, generic client proxy 140 may provide an interface, such as a Remote Procedure Call (RPC) or SOAP interface, to service manager 160 at server system 190 through network connection 150b. Generic client proxy 140 may be implemented to control the functionality available to user interface 120 by providing a well-defined interface to service manager 160. For example, service manager 160 may include a variety of procedures, but generic client proxy 140 may be allowed access only to a subset of those procedures. Moreover, generic client proxy 140 may buffer requests and/or responses between user interface 120 and service manager 160.

Network connections 150a-150f may include, alone or in any suitable combination, a telephony-based network, a local area network (LAN), a wide area network (WAN), a dedicated intranet, wireless LAN, the Internet, an intranet, a wireless network, a bus, or any other communication mechanisms. Further, any suitable combination of wired and/or wireless components and systems may provide network connections 150a-150f. Moreover, network connections 150a-150f may be embodied using bi-directional, unidirectional, or dedicated communication links. Network connections 150a-150f may also implement standard transmission protocols, such as Transmission Control Protocol/Internet Protocol (TCP/IP), Hyper Text Transfer Protocol (HTTP), SOAP, RPC, or other protocols.

Server system 190 may include one or more processors, such as computers, to interface with other computers, such as client system 190. Generic client proxy 140 calls the API of service manager 160 at server 190. When the API of service manager 160 is called, an instance of the service manager 160 is created at server system 190. Although service manager is depicted within server 190, service manager 160 can be located anywhere and distributed among multiple locations.

Moreover, when the API of service manager 160 is called, service manager 160 may call a procedure through an API to instantiate one or more of the service providers 180-181. When service provider 180 is instantiated by service manager 160, service provider 180 may also instantiate one or more corresponding business objects. For example, a user of user interface 120 may access service provider 180 to interact with a product catalog. The data and methods associated with providing the product catalog to user interface 120 correspond to a business object. A business object node refers to a portion of the business object. Returning to the above product catalog example, a business object node may refer to another object, such as a price or a product description included within the business object. The business object and nodes may be stored in, for example, database 170 and/or repository 175. As noted above, during the development of the product catalog service provider, user interface 120 development cannot proceed independently of the development of the product catalog service provider and its corresponding business objects. However, the use of mockup business objects within the framework of system 100 allows user interface 120 to be developed independently of the catalog service provider.

Repository 175 may store information associated with the business objects (e.g., the product catalog service provider) including metadata for the business objects. For example, repository 175 may store a list of business object nodes including an identifier (ID) and data content. The ID of a business object refers to an identifying memory address of a business object node that uniquely identifies individual business object nodes within repository 175. The memory address can be used to access and read data content of a particular business object node. For example, an ID of a business object node may consist of a directory structure and filename associated with the business object node. Repository 175 may be implemented as an enterprise services repository, although any other computer-readable storage medium may be used.

Repository 175 may also store metadata regarding one or more business objects. Metadata may be defined as data about data. For example, metadata may refer to information about the data itself, such as content, quality, condition, origin, size, formatting, characteristics of data, and the like. The eXtensible Markup Language (XML) is a specific example of metadata because it is a format used to define other data objects. Metadata may include a schema. A schema is the organization or structure, such as the organization of a database or the structure of an object in an object oriented program. In object oriented programming, modeling (i.e., the analysis of objects that are used in a business or other context and the identification of the relationships among these data objects) leads to a schema, which can be stored in repository 175 as a schema. The schema can be depicted visually as a structure or a formal text-oriented description (e.g., script). For example, metadata may be in the form of database tables. The metadata may include information such as the number of nodes in a business object, the name(s) of the nodes, the position of a node in the business object hierarchy, the structure of a node, associations, actions, and default queries on a node.

Figure 1B:
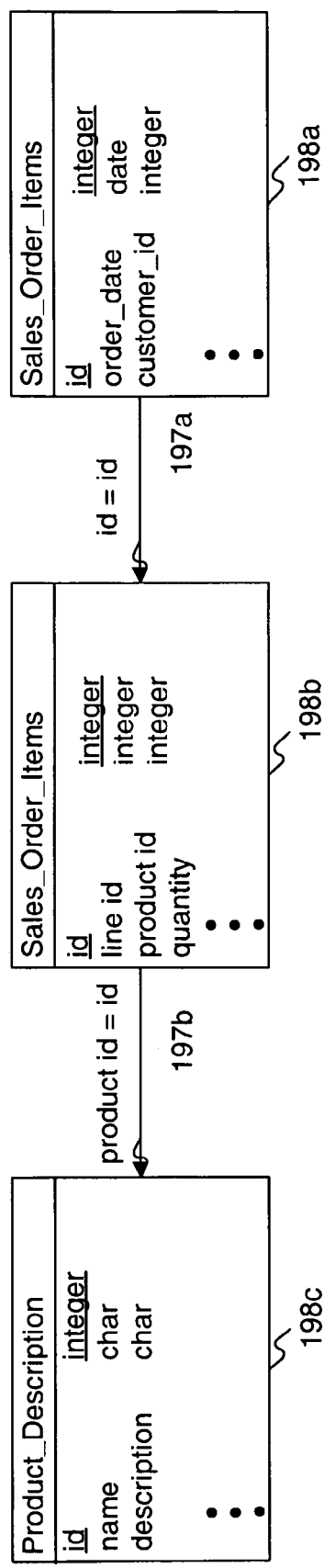
FIG. 1B illustrates an exemplary schema consistent with certain aspects related to the present invention.

FIG. 1B depicts an example schema for business object nodes stored at repository 175. The schema includes a business object node for a sales order 198a, sales order items 198b included with sales order 198a, and the corresponding product description 198c. Moreover, the schema depicted in FIG. 1B may include keys 197 that identify the relationships among the business object nodes 198. For example, key 197a is a sales order identification value ("id") that is used to link business object nodes 198a and 198b. Key 197b links the product identification values (labeled at FIG. 1B as "product id") of sales order item 198b to the product identification value (labeled "id") of product description 198c. The schema, which depicts business object nodes and how they are associated to one another, may be considered metadata and stored in repository 175. Moreover, the schema may be considered a "model" of how to implement these business object nodes. The model may serve as a template to enable the composition of other models for business objects and their nodes. The models may also be used to generate script for generating code for the business objects and their nodes. The schema may be stored as metadata in repository 175. During the final implementation of system 100, a user would interact with a service provider (e.g., to receive a product catalog) to access the business objects stored at repository 175.

Mockup service adapter 196 may include an API, which when called generates mockup business objects using metadata. For example, the metadata stored in repository 175 may be used to generate mockup business objects. Specifically, if the schema of FIG. 1B depicts a model of an actual business object, the model may be used to provide a similar model for generation of mockup business objects. Mockup service adapter 196 stores any generated mockup business objects in mockup storage. At runtime, the mockup business objects are used, such that development of components of system 100 may occur independently. For example, a user interface designer can develop user interface 120 to interact with a mockup business object without regard to the actual business objects that might be used when system 100 is completed. The use of mockup business objects may thus improve system development.

Figure 2:
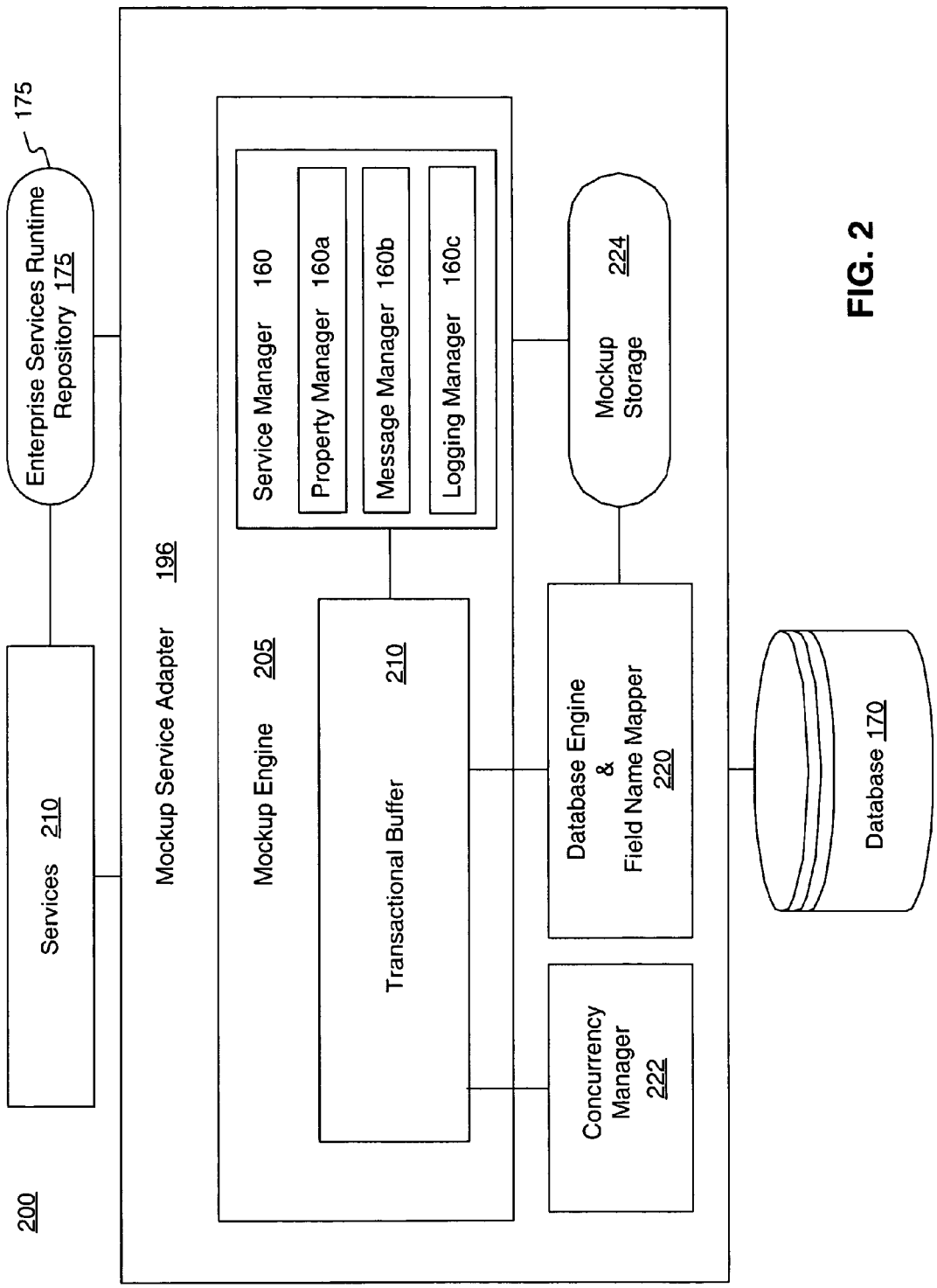
FIG. 2 illustrates another block diagram of an exemplary system at runtime consistent with certain aspects related to the present invention.

FIG. 2 depicts an exemplary mockup service adapter 196. Mockup service adapter 196 may generate, based on metadata stored in repository 175, mockup business objects. Mockup service adapter 196 may also store the mockup business objects in mockup storage 224. Moreover, mockup service adapter 196 may instantiate mockup business objects during runtime. The steps for generating the mockup business objects are described below with respect to FIG. 3. Referring to FIG. 2, when called by service manager 160, mockup service adapter 196 calls a mockup engine 205.

Mockup engine 205 may ensure that the proper message is used to make a call to an API, such as calls to service manager 160, mockup storage 224, and other components of system 200. Mockup engine 205 may also provide a simple before-image retrieval implementation. A before-image retrieval implementation stores the state of a database before a change is made to the database.

Transactional buffer 210 manages transactional buffering, such as create, retrieve, update, and delete procedures performed on the mockup business object nodes of mockup storage 224. For example, service manager 160 may call various procedures from service providers 180-181 to instantiate a mockup business object stored at mockup storage 224 to interact with and manipulate the mockup business object nodes. These procedures may include instructions to create, retrieve, update, and delete mockup business object nodes corresponding to service providers 180-181. For example, a "create" procedure can be used to create a new mockup business object node, an "update" procedure to update data content in one or more mockup business object nodes, a "retrieve" procedure to retrieve mockup business object nodes, and a "delete" procedure to delete one or more mockup business object nodes. Moreover, procedures can be used in combination, such as a "query" procedure and a "retrieve" procedure, to search and retrieve data content from mockup business object nodes. When using the create, retrieve, update, and delete procedures, transactional buffer 205 may also implement additional procedures, such as check, save, and clean-up, as well as support change notifications to change handlers at service manager 160. Although the above description of transactional buffer 210 as performing procedures, such as create, retrieve, update, and delete, on the mockup business objects, transaction buffer may also perform the procedures any objects.

Transactional buffer 210 may also provide the implementation of the default queries. A mockup business object node may have associated default queries on fields of a business object node. For example, each mockup business object node may have an associated database table (e.g., tables corresponding to nodes 198a-c) that includes fields and a default SQL query of those fields. Transactional buffer 210 may enable merging of database data and buffer data. For example, changes to a mockup business object node may be stored in a buffer until a save is implemented to a database. When the save is called, any changes in the buffer are written to the database, such that the changes are entered in an ordered (or phased) manner. Transactional buffer 210 may also provide the parent-child and child-parent navigation through the mockup business object nodes. For example, a mockup business object model stored at mockup storage 224 may include a schema (see, e.g., FIG. 1B) that defines a parent node (e.g., node 198a) and child node (e.g., node 198b). The parent node may be a mockup business object node for generating a sales order, and one of the child nodes may be an object of the sales order (e.g., items contained within the order and product descriptions for the items). Transactional buffer 210 may thus provide navigation between those nodes 198. Although the mockup business object node is described in connection with a sales order business object, other types of objects may be used.

Database engine and field name mapper 220 may provide access to database 170 and provide any necessary mapping functionality between proxy names and database names. The proxy names of node fields (e.g., "product id" at node 198b) may represent the ABAP (Advanced Business Application Programming) name for the node fields in an ABAP dictionary generated at the time of proxy generation of the mockup business object. When database tables for the mockup business object nodes are created using metadata, it may not practical to create the column names of the database table with exactly the same name as the proxy names. As such, database 170 may use "pseudo" names rather than the actual proxy names used by the mockup business object nodes. Database engine 220 may also include an API that limits access to database 170. For example, only engine 220 may be aware of the actual pseudo field names used in database 170. All other components of system 200 may only know the proxy name, which is mapped by engine 220 to the actual pseudo field name at database 170. Database engine 220 may also provide a default query procedure. For example, a mockup business object node may include a predefined query to serve as a default query. As such, the default query (defined by the mockup engine) would be any query defined on the mockup business object node (or its corresponding database table).

The concurrency manager 222 provides lock management. Lock management refers to locking a mockup business object to allow accurate access to information associated with the mockup business object. For example, while a mockup business object (or its node) is being updated, it may be locked until after the update.

Service Manager 160 instance may include a message handler 160b for handling messages to and from service manager 160; a change handler 160c for handling changes affecting service providers 180-181 (e.g., changes that occur when user interface 120 changes, such as a button click, affect a service provider or the corresponding mockup business objects); and a controller 160a for controlling dynamic properties of the instance (e.g., node 198a may include data fields that are mandatory, read-only, invisible, and the like). Service manager 160 may also include a stack for storing changes associated with the change handler in a last in, first out manner. Although service manager 160 is depicted in FIG. 2 at mockup engine 205, other service manager instances may be included within system 200 including at services 210.

Moreover, when the API of service manager 160 is called by mockup service adapter 196, service manager 160 may instantiate one or more service providers 180-181 and corresponding mockup business objects.

Mockup storage 224 provides storage of mockup business objects and their business object nodes (see, e.g., FIG. 1B). Mockup storage 224 may also include metadata. Although mockup storage 224 may be used to store all data associated with the mockup business objects, the actual data associated with a mockup business object node may be stored in another locations, such as database 170. Referring to FIG. 1B, the mockup business object nodes may correspond to nodes 198. In this example, the data associated with the order date of node 198a may be stored at database 170. Mockup storage 224 may be implemented as a computer-readable storage medium (e.g., a disk drive, optical drive, and the like). Mockup storage 224 is described further below with respect to FIG. 3.

Services 210 represent applications (e.g., service providers, services, web services, and the like) that are available for calling to and from mockup service adapter 196. For example, the create, update, retrieve, delete procedures described above may be accessible at service 210 as a service available to the framework of system 200.

Figure 3:
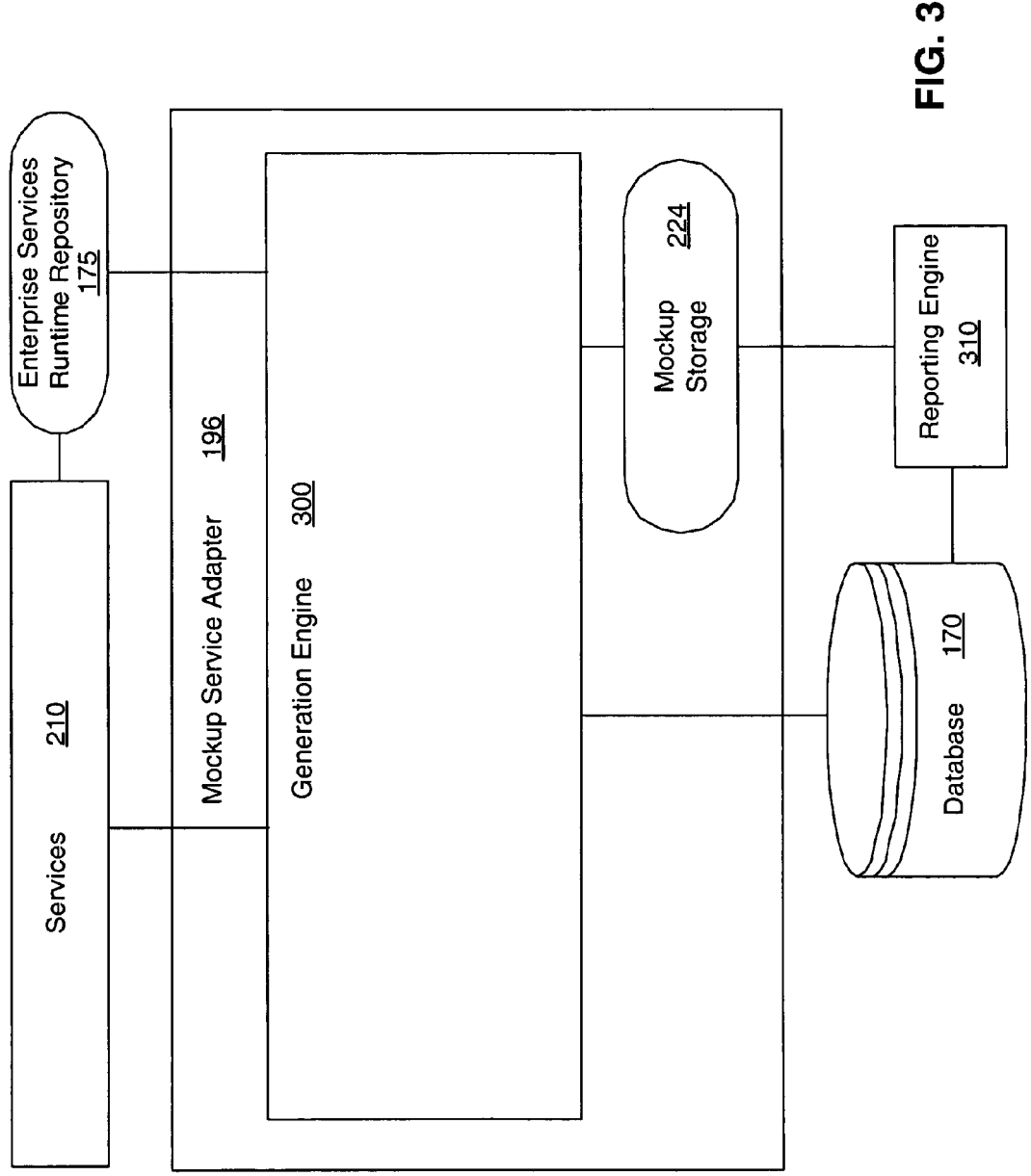
FIG. 3 illustrates another block diagram of an exemplary system used to generate objects consistent with certain aspects related to the present invention.

FIG. 3 depicts system 200 when generation engine 300 is called by mockup service adapter 196 to generate mockup business objects. Generation engine 300 then generates a complete schema for the mockup business objects that are stored in mockup storage 224. The mockup business objects are generated independently of any actual business objects. For example, based on the business object metadata stored in mockup storage 224, generation engine 300 creates a schema (e.g., the tables depicted in FIG. 1B) for the mockup business object nodes, and stores the resulting mockup business object nodes in mockup storage 224. The tables have technical names, such as sales_order, sales_order_items, and product_description. Database Engine 220 maps these technical names to an appropriate storage mechanism, such as mockup storage 224 or database 170. Moreover, engine 220 may resolve any potential conflicts that can occur when multiple mockup business object nodes use the same technical name or field name. The association between mockup business object nodes, database table names, and field names (see, e.g., 198a at "id", "order_data," and "customer_id") may be stored in mockup storage 224. In addition to the mapping information, mockup storage 224 may also include administration information (e.g., created-by, created-on, and last change), which can be used by the reporting engine 310 to create reports. Moreover, the administration information may also be considered metadata for storage at mockup storage 224.

Mockup storage 224 may also store information (including version information) for administration of schemas. The stored information may be used by generation engine 300 for updating the schemas. Generation engine 300 may also provide an API for deleting the complete database schema or parts of the schema (e.g., deleting a node of a mockup business object node). Generation engine 300 may also provide an API for adding to the schema or parts of the schema (e.g., adding a node of a mockup business object node).

The reporting engine 310 may generate reports including a logging report, a delta report to show changes when compared to a previous report, and an audit report to show errors or faults. When a schema is generated, the logging report is created to show all the steps that were logged during schema generation.

Figure 4:
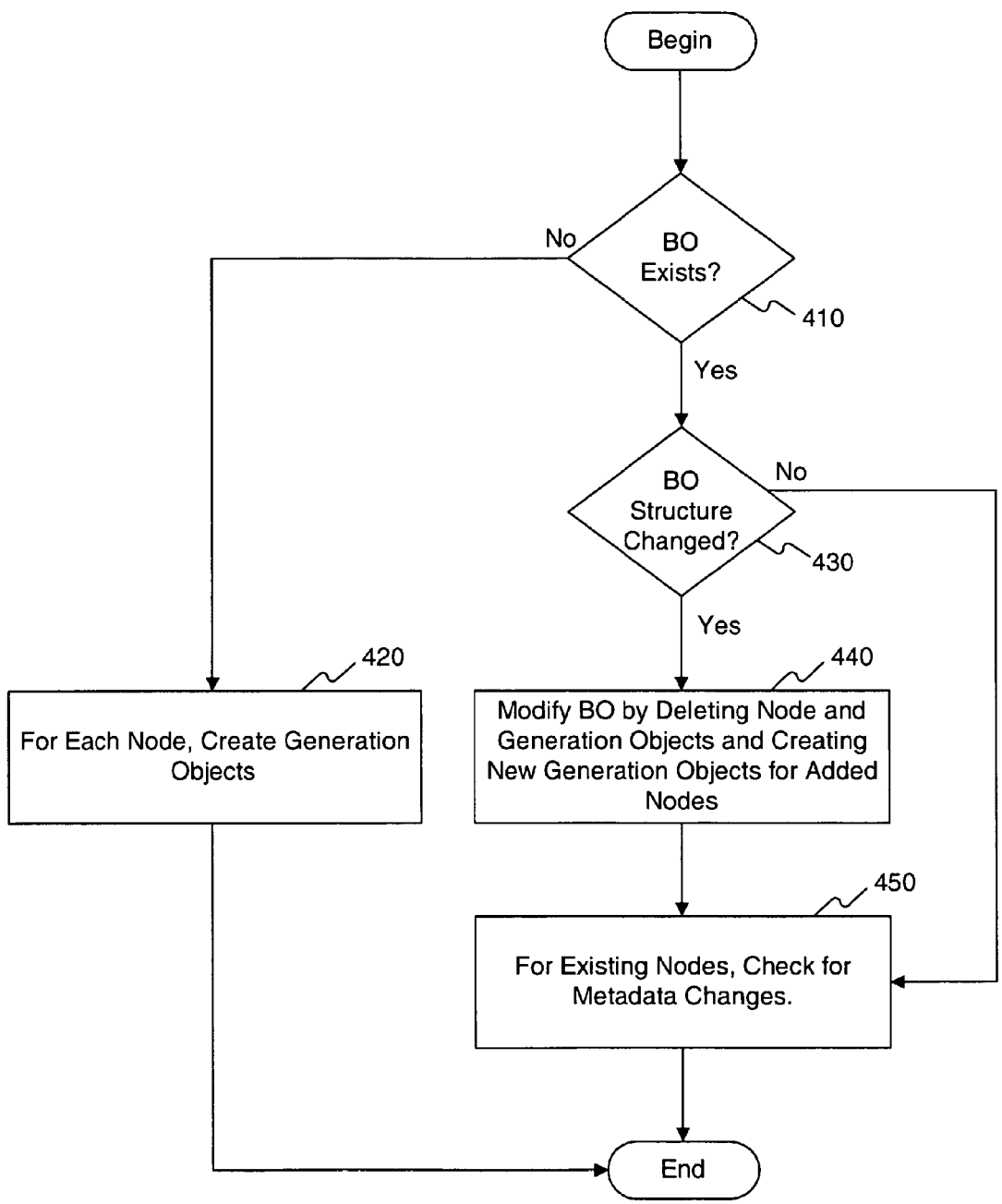
FIG. 4 illustrates a flow chart with exemplary steps for generating objects consistent with certain aspects related to the present invention.

FIG. 4 is a flowchart of exemplary steps for generating mockup business objects. Referring to FIGS. 3 and 4, when service manager 160 calls mockup service provider 196, the call may initiate steps 400.

The call to mockup service provider 196 initiates generation engine 300 to determine whether a mockup business object exists. For example, if the mockup business object requested by the call does not have any corresponding data stored at mockup storage 224, generation engine 300 may determine that the business object does not exist and generate a mockup business object based on the metadata stored at mockup storage 224 (steps 410-420). For example, generating a mockup business object may include generating a mockup persistency, such as generating a model or a schema for the mockup business object. The mockup business object may be generated from metadata. For example, the database schema may be derived from the composition nodes of the business object and the names of the tables. However, the fields name may not be mapped one to one due to database management restrictions (e.g., the field names of a table and the database may have only 16 characters, while, on the other hand, the business object node field names may have 255 characters). To generate the mockup business object based on the metadata (step 420), generation engine 300 may generate objects. The generated objects may be implemented as objects as a data dictionary (DDIC), which are created to provide mockup functionality (e.g., database tables for the business object nodes).

If the mockup business object exists, generation engine 300 may then determine whether the structure of the mockup business object node has changed (step 430). The schema may be considered "changed" when the schema changes in any way, such as the deletion of a field at a mockup business object node or the change of a data type (e.g., a change from an integer data type to a character data type). When there has been a change, generation engine 300 may determine that the structure of the mockup business object (or its node(s)) has changed. If the structure has changed, generation engine 300 may modify the stored mockup business object (or its nodes). For example, generation engine 300 may delete any deleted mockup business object nodes and create generation objects for any added nodes (step 440). If a mockup business object containing nodes A and B has changed to include only nodes B and C, the previously generated objects of node A would be deleted, while newly generated objects would be created for node C. When node A is deleted, transaction buffer 210 may be used to facilitate the deletion. If the structure has not changed, generation engine 300 may, for an existing mockup business object node, check for metadata changes at mockup storage 224 (step 450). To check for changes, the following properties of the old and the new node structure fields may be compared to identify changes: data type, length, decimal, and number of fields for a given node. In the case of a change, mockup storage 224 creates a new version of the mockup business object node.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

The foregoing description is intended to illustrate but not to limit the scope of the invention, which is defined by the scope of the appended claims. Other embodiments are within the scope of the following claims.

What is claimed is:

1. A method comprising:

determining, within a computer framework comprising one or more processors, that a request received from a developer of a first in-development component of the computer framework for interaction with a second in-development component of the computer framework requires instantiation of an actual business object of the second in-development component, the actual business object not yet existing within the computer framework;

generating, within the computer framework, a mockup business object based on metadata stored within a database in the computer framework, the metadata depicting a model of the actual business object;

persisting the mockup business object in a mockup storage of the computer framework; and instantiating the mockup business object from the mockup storage at runtime of the first in-development component such development of the first in-development component proceeds independently of and in parallel to development of the second in-develop component;

wherein upon determining, based on the metadata, a change in a structure of the mockup business object, modifying the stored mockup business object based on the determined change to implement the change to the structure of the stored mockup business object;

and wherein the change to the structure comprises deletion or addition of a node associated with the mockup business object.

2. The method of claim 1, wherein generating further comprises:

implementing the mockup business object as an object of a data dictionary to provide database tables for one or more nodes of the mockup business object.

3. The method of claim 1, wherein generating further comprises:

determining that the mockup business object does not already exist in the mockup storage.

4. A system comprising:

at least one processor; and at least one memory storing instructions that, when executed by the at least one processor, cause the at least one processor to perform operations comprising:

determining, within a computer framework implemented on the at least one processor, that a request received from a developer of a first in-development component of the computer framework for interaction with a second in-development component of the computer framework requires instantiation of an actual business object of the second in-development component, the actual business object not yet existing within the computer framework;

generating, within the computer framework, a mockup business object based on metadata stored within a database in the computer framework, the metadata depicting a model of the actual business object;

persisting the mockup business object in a mockup storage of the computer framework; and instantiating the mockup business object from the mockup storage at runtime of the first in-development component such development of the first in-development component proceeds independently of and in parallel to development of the second in-development component;

wherein upon determining, based on the metadata, a change in a structure of the mockup business object, modifying the stored mockup business object based on the determined change to implement the change to the structure of the stored mockup business object;

and wherein the change to the structure comprises deletion or addition of a node associated with the mockup business object.

5. The system of claim 4, wherein the operations further comprise:

implementing the mockup business object as an object of a data dictionary to provide database tables for one or more nodes of the mockup business object.

6. The system of claim 4, wherein generating further comprises:

determining that the mockup business object does not already exist in the mockup storage.

7. A non-transitory machine readable memory containing instructions that, when executed by at least one processor, cause the at least one processor to perform operations comprising:

determining, within a computer framework comprising one or more processors, that a request received from a developer of a first in-development component of the computer framework for interaction with a second in-development component of the computer framework requires instantiation of an actual business object of the second in-development component, the actual business object not yet existing within the computer framework;

generating, within the computer framework a mockup business object based on metadata stored within a database in the computer framework, the metadata depicting a model of the actual business object;

persisting the mockup business object in a mockup storage of the computer framework; and instantiating the mockup business object from the mockup storage at runtime of the first in-development component such development of the first in-development component proceeds independently of and in parallel to development of the second in-development component;

wherein upon determining, based on the metadata, a change in a structure of the mockup business object, modifying the stored mockup business object based on the determined change to implement the change to the structure of the stored mockup business object;

and wherein the change to the structure comprises deletion or addition of a node associated with the mockup business object.

8. The non-transitory machine readable memory of claim 7, wherein the operations further comprise:

implementing the mockup business object as an object of a data dictionary to provide database tables for one or more nodes of the mockup business object.

9. A system comprising:

computer implemented means for determining, within a computer framework comprising one or more processors, that a request received from a developer of a first in-development component of the computer framework for interaction with a second in-development component of the computer framework requires instantiation of an actual business object of the second in-development component, the actual business object not yet existing within the computer framework;

computer implemented means for generating, within the computer framework, a mockup business object based on metadata stored within a database in the computer framework, the metadata depicting a model of the actual business object;

computer implemented means for persisting the mockup business object in a mockup storage of the computer framework;

computer implemented means for instantiating the mockup business object from the mockup storage at runtime of the first in-development component such development of the first in-development component proceeds independently of and in parallel to development of the second in-development component; and computer implemented means for modifying the stored mockup business object such that upon determining, based on the metadata, a change in a structure of the mockup business object, the stored mockup business object is modified based on the determined change to implement the change to the structure of the stored mockup business object;

and wherein the change to the structure comprises deletion or addition of a node associated with the mockup business object.

10. A method comprising:

determining, within a computer framework comprising one or more processors, that a request received from a developer of a first in-development component of the computer framework for interaction with a second in-development component of the computer framework requires instantiation of an actual business object of the second in-development component, the actual business object not yet existing within the computer framework;

generating, within the computer framework, a mockup business object based on metadata stored within a database in the computer framework, the metadata depicting a model of the actual business object;

persisting the mockup business object in a mockup storage of the computer framework; and instantiating the mockup business object from the mockup storage at runtime of the first in-development component such development of the first in-development component proceeds independently of and in parallel to development of the second in-develop component;

wherein upon determining, based on the metadata, a change in a structure of the mockup business object, modifying the stored mockup business object based on the determined change to implement the change to the structure of the stored mockup business object;

and wherein the change to the structure comprises deletion or addition of a field associated with the mockup business object.

11. The method of claim 10, wherein generating further comprises:

implementing the mockup business object as an object of a data dictionary to provide database tables for one or more nodes of the mockup business object.

12. The method of claim 10, wherein generating further comprises:

determining that the mockup business object does not already exist in the mockup storage.

13. A system comprising:

at least one processor; and at least one memory storing instructions that, when executed by the at least one processor, cause the at least one processor to perform operations comprising:

determining, within a computer framework implemented on the at least one processor, that a request received from a developer of a first in-development component of the computer framework for interaction with a second in-development component of the computer framework requires instantiation of an actual business object of the second in-development component, the actual business object not yet existing within the computer framework;

generating, within the computer framework, a mockup business object based on metadata stored within a database in the computer framework, the metadata depicting a model of the actual business object;

persisting the mockup business object in a mockup storage of the computer framework; and instantiating the mockup business object from the mockup storage at runtime of the first in-development component such development of the first in-development component proceeds independently of and in parallel to development of the second in-development component;

wherein upon determining, based on the metadata, a change in a structure of the mockup business object, modifying the stored mockup business object based on the determined change to implement the change to the structure of the stored mockup business object;

and wherein the change to the structure comprises deletion or addition of a field associated with the mockup business object.

14. The system of claim 13, wherein the operations further comprise:

implementing the mockup business object as an object of a data dictionary to provide database tables for one or more nodes of the mockup business object.

15. The system of claim 13, wherein generating further comprises:

determining that the mockup business object does not already exist in the mockup storage.

16. A non-transitory machine readable memory containing instructions that, when executed by at least one processor, cause the at least one processor to perform operations comprising:

determining, within a computer framework comprising one or more processors, that a request received from a developer of a first in-development component of the computer framework for interaction with a second in-development component of the computer framework requires instantiation of an actual business object of the second in-development component, the actual business object not yet existing within the computer framework;

generating, within the computer framework a mockup business object based on metadata stored within a database in the computer framework, the metadata depicting a model of the actual business object;

persisting the mockup business object in a mockup storage of the computer framework; and instantiating the mockup business object from the mockup storage at runtime of the first in-development component such development of the first in-development component proceeds independently of and in parallel to development of the second in-development component;

wherein upon determining, based on the metadata, a change in a structure of the mockup business object, modifying the stored mockup business object based on the determined change to implement the change to the structure of the stored mockup business object;

and wherein the change to the structure comprises deletion or addition of a field associated with the mockup business object.

17. The non-transitory machine readable memory of claim 6, wherein the operations further comprise:

implementing the mockup business object as an object of a data dictionary to provide database tables for one or more nodes of the mockup business object.

18. A system comprising:

computer implemented means for determining, within a computer framework comprising one or more processors, that a request received from a developer of a first in-development component of the computer framework for interaction with a second in-development component of the computer framework requires instantiation of an actual business object of the second in-development component, the actual business object not yet existing within the computer framework;

computer implemented means for generating, within the computer framework, a mockup business object based on metadata stored within a database in the computer framework, the metadata depicting a model of the actual business object;

computer implemented means for persisting the mockup business object in a mockup storage of the computer framework;

computer implemented means for instantiating the mockup business object from the mockup storage at runtime of the first in-development component such development of the first in-development component proceeds independently of and in parallel to development of the second in-development component; and computer implemented means for modifying the stored mockup business object such that upon determining, based on the metadata, a change in a structure of the mockup business object, the stored mockup business object is modified based on the determined change to implement the change to the structure of the stored mockup business object;

and wherein the change to the structure comprises deletion or addition of a field associated with the mockup business object.

* * * * *